United States Patent
Nakamura et al.

(10) Patent No.: US 8,046,143 B2
(45) Date of Patent: Oct. 25, 2011

(54) AUTOMATIC GEAR CONTROL DEVICE

(75) Inventors: Kazuaki Nakamura, Toyota (JP);
  Hiromichi Kimura, Okazaki (JP); Shun Minaki, Toyota (JP); Koji Oshima, Nagoya (JP); Tomohiro Asami, Nissin (JP); Takahiro Kondo, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 912 days.

(21) Appl. No.: 11/911,866

(22) PCT Filed: Apr. 17, 2006

(86) PCT No.: PCT/JP2006/308486
§ 371 (c)(1),
(2), (4) Date: Oct. 18, 2007

(87) PCT Pub. No.: WO2006/112528
PCT Pub. Date: Oct. 26, 2006

(65) Prior Publication Data
US 2009/0055063 A1   Feb. 26, 2009

(30) Foreign Application Priority Data
Apr. 18, 2005 (JP) ................. 2005-119968

(51) Int. Cl.
*B60W 10/02* (2006.01)
(52) U.S. Cl. ............... 701/67; 701/60; 701/68; 477/176
(58) Field of Classification Search ............ 701/67
See application file for complete search history.

(56) References Cited

U.S. PATENT DOCUMENTS

| | | | | |
|---|---|---|---|---|
| 4,657,122 A | * | 4/1987 | Sakakibara et al. | 192/3.31 |
| 5,085,301 A | * | 2/1992 | Imamura et al. | 477/169 |
| 5,267,158 A | * | 11/1993 | Sakaguchi et al. | 701/68 |
| 6,050,919 A | * | 4/2000 | Kusafuka et al. | 477/176 |
| 6,070,118 A | * | 5/2000 | Ohta et al. | 701/65 |
| 6,607,467 B2 | * | 8/2003 | Tabata | 477/33 |

(Continued)

FOREIGN PATENT DOCUMENTS

JP   1 93665   4/1989

(Continued)

OTHER PUBLICATIONS

Office Action dated Jun. 15, 2010, in German Patent Application No. 11 2006 000 948.6-14, national entry date Oct. 19, 2007 (with English-language translation).
Office Action mailed Jan. 28, 2009, in Korean Patent Application No. 10-2007-7026733, national entry date Nov. 16, 2007 (with partial English-language translation).
Allowance of Patent mailed May 19, 2009, in Korean Patent Application No. 10-2007-7026733, national entry date Nov. 16, 2007 (with English-language translation).
Office Action issued Feb. 27, 2009, in Chinese Patent Application No. 200680013025.9, national entry date Oct. 18, 2007 (with English-language translation).

(Continued)

*Primary Examiner* — Shelley Chen
(74) *Attorney, Agent, or Firm* — Oblon, Spivak, McClelland, Maier & Neustadt, L.L.P.

(57) ABSTRACT

An ECU executes a program including: a step of detecting a turbine revolution speed, a step of detecting an engine torque TE, a step of detecting a speed change ratio, a step of setting a range an enlarged slip region when a slip region enlargement condition is satisfied, and a step of enlarging the slip region toward a lock-up region side (high-load side).

5 Claims, 6 Drawing Sheets

U.S. PATENT DOCUMENTS

| | | | |
|---|---|---|---|
| 6,780,140 B2 * | 8/2004 | Okamoto et al. | 477/62 |
| 6,790,157 B2 * | 9/2004 | Tabata | 477/33 |
| 6,790,158 B2 * | 9/2004 | Tabata | 477/33 |
| 6,817,965 B2 * | 11/2004 | Tabata | 477/33 |
| 7,189,188 B2 * | 3/2007 | Nobumoto et al. | 477/176 |
| 2002/0006848 A1 * | 1/2002 | Tabata | 477/32 |
| 2003/0195083 A1 * | 10/2003 | Tabata | 477/168 |
| 2003/0195084 A1 * | 10/2003 | Tabata | 477/168 |
| 2003/0199361 A1 * | 10/2003 | Tabata | 477/181 |
| 2004/0018913 A1 * | 1/2004 | Okamoto et al. | 477/62 |
| 2004/0157705 A1 * | 8/2004 | Nobumoto et al. | 477/174 |

FOREIGN PATENT DOCUMENTS

| | | |
|---|---|---|
| JP | 2 256963 | 10/1990 |
| JP | 9 60719 | 3/1997 |
| JP | 2002 323129 | 11/2002 |
| JP | 2004 150548 | 5/2004 |
| JP | 2004 263733 | 9/2004 |

OTHER PUBLICATIONS

Notification on the Grant of Patent Right for Invention issued Jun. 22, 2010, in Chinese Patent Application No. 200680013025.9, national entry date Oct. 18, 2007 (with English-language translation).

Office Action dated Jun. 15, 2010, in German Patent Application No. 11 2006 000 948.6-14, national entry date Oct. 19, 2007 (with English-language translation).

Office Action issued Jul. 31, 2009, in Chinese Patent Application No. 200680013025.9, national entry date Oct. 18, 2007 (with English-language translation).

* cited by examiner

F I G. 3

|  | C1 | C2 | B1 | B2 | B3 | F |
|---|---|---|---|---|---|---|
| 1ST | ○ | × | × | ◎ | × | △ |
| 2ND | ○ | × | ○ | × | × | × |
| 3RD | ○ | × | × | × | ○ | × |
| 4TH | ○ | ○ | × | × | × | × |
| 5TH | × | ○ | × | × | ○ | × |
| 6TH | × | ○ | ○ | × | × | × |
| R | × | × | × | ○ | ○ | × |
| N | × | × | × | × | × | × |

○ ENGAGED
× DISENGAGED
◎ OPERATED DURING ENGINE BRAKING
△ OPERATED ONLY DURING DRIVING

AUTOMATIC GEAR CONTROL DEVICE

TECHNICAL FIELD

The present invention relates to a lockup clutch arranged in a hydrodynamic power transmission device such as a torque converter forming an automatic transmission, and particularly to slip control in the lockup clutch.

BACKGROUND ART

An automatic transmission that incorporates an electromagnetic valve and adjusts variables relating to a gear shift operation, such as a gear, a hydraulic pressure level, a time constant or timing in the gear shift operation, and the like, by means of an ECU (Electronic Control Unit) by receiving an electrical signal from the outside has been put into use. Such an ECU allows reliable and prompt transition of an operation state of the automatic transmission to various states. In addition, as the ECU incorporates a CPU (Central Processing Unit), control using program can be carried out. Accordingly, if an operation state of the automatic transmission is finely set by modifying a program or various constants, optimal performance of the automatic transmission can be obtained in line with a running state of a vehicle or a state of load onto an engine. Here, the running state of the vehicle refers to a vehicle speed, a steering operation, frequency and a level of acceleration and deceleration, a road surface state, and the like, while the state of load onto the engine refers to an engine speed, a throttle position, an accelerator pedal pressing degree, torque of input and output shafts of an engine or an automatic transmission, and the like.

The above kind of automatic transmission has a multi-gear transmission mechanism having a plurality of power transmission paths or a continuously variable transmission mechanism, e.g., of a belt type, and is configured, for example, such that the power transmission paths are automatically selected or diameters of pulleys carrying a belt is automatically changed based on the accelerator pedal pressing degree and the vehicle speed, and thereby the speed change ratio is automatically changed.

For implementing the above automatic transmission, a mechanism that can keep a vehicle in a stopped state while an engine is operating, and can also transmit a drive power of the engine to a transmission mechanism (i.e., a mechanism allowing slipping between input and output shafts) must be arranged between the engine and the transmission mechanism. Fluid couplings are a kind of such mechanisms, and torque converters having a torque amplifying function are presently used in many cases.

For the torque converters, the following technology has been known. A lockup clutch that can directly couple input and output shafts of the torque converter together is controlled to perform feedback control (slip control) so that a coupling force of the lockup clutch may attain a predetermined state according to a difference between a pump rotation speed on an input side (corresponding to an engine revolution speed) and a turbine rotation speed on an output side. Based on a learned value obtained thereby, feedforward control is appropriately performed on the slip state of the torque converter so that vibrations and noises (NV: Noise & Vibration) are prevented, and a vehicle starting performance is improved.

By the above highly developed electronic control, the power transmission allocation of mechanical power transmission through the lockup clutch and power transmission through the torque converter is finely control according to the driving state, and thereby transmission efficiency is significantly increased.

Thus, this lockup clutch is controlled based on the driving state of the vehicle such as a load, revolution speed and the like. For example, a low-load and high-speed region is set to a lock-up region, a high-load and low-speed region is set to a converter region, and a low-load and a middle-speed region is set to a slip region. In the lock-up region, input and output elements of the hydrodynamic power transmission device are completely coupled together to improve fuel consumption. In the converter region, the input and output elements of the hydrodynamic power transmission device are completely released from each other to increase the torque by a torque amplifying function of the torque converter. In the slip region, the input and output elements of the hydrodynamic power transmission device are partially coupled to improve the fuel consumption and to absorb shocks and vibrations.

When the driving state of the vehicle changes from the converter region to the slip region, the coupling force of the lockup clutch is usually controlled (i.e., the above slip control is performed) so that a slippage between the input and output elements of the hydrodynamic power transmission device may converge to a predetermined target slippage. In this operation, when a long time (long converging time) is required for converging the actual slippage to the target slippage, this lowers an effect of improving the fuel consumption. Conversely, when the converging time is short, the engine revolution speed rapidly lowers to cause deterioration of drivability and drive feeling. Accordingly, it has been known to perform learning correction on a control quantity of the coupling force of the lockup clutch (e.g., a duty ratio applied to a solenoid pipe arranged in a hydraulic circuit) according to individual differences, variations, secular changes and the like of the lockup clutch, the solenoid valve and others so that the converging time may become equal to the predetermined target time keeping the above problem unnoticeable (i.e., the slippage may converge to the predetermined target slippage at a target time).

Japanese Patent Laying-Open No. 2004-150548 has disclosed a slip control device of a lockup clutch that can increase a frequency of learning as far as possible in slip control of a lockup clutch. The slip control device of the lockup clutch includes a determining unit determining whether a driving state of a vehicle belongs to a lock-up region where input and output elements of a hydrodynamic power transmission device are completely coupled together, a slip region where the input and output elements are partially coupled together or a converter region where the input and output elements are completely released, and a slip controller controlling a coupling force of the lockup clutch to converge a slippage between the input and output elements of the hydrodynamic power transmission device to a predetermined target slippage when the determining unit determines that the driving state of the vehicle changed from the converter region to the slip region. This slip control device of the lockup clutch further includes a setting unit setting a target value of the slippage at a predetermined point in time before the slip control by the slip controller converges the slippage between the input and output elements of the hydrodynamic power transmission device to the target slippage, a correcting unit performing correction according to the target value set by the setting unit and an actual value of the slippage at the predetermined point in time, and thereby correcting a control quantity of the coupling force of the lockup clutch to attain the actual value equal to the target value, and a learning unit causing the slip controller to perform next slip control, using the control quantity corrected by the correcting unit.

This slip control device of the lockup clutch sets in advance the target value of the slippage attained between the input and output elements of the hydrodynamic power transmission device at the predetermined point in time before the slip control converges the above slippage to the target slippage, and the learning correction is performed on the control quantity of the coupling force of the lockup clutch according to the target value and the actual value at the above predetermined point in time. Therefore, data for performing the learning correction on the slip control can be collected or the learning correction can be performed before the slippage actually converges to the target slippage, without waiting for the completion of the slip control. Consequently, the frequency of the learning correction increases regardless of the state and progress of subsequent slip control (i.e., without being affected whether the slip control is fully completed or is interrupted before the full completion), and this removes the influence by individual differences, variations, secular changes and the like of the lockup clutch so that improvement of the accuracy of the slip control is promoted.

As described above, there has recently been a strong tendency to enlarge further the lock-up region, and the learning frequency in the lock-up region tends to decrease. In Japanese Patent Laying-Open No. 2004-150548 already described, when the slip control does not start, the learning control will be performed before the slippage (i.e., the result of the slip control) converges to the target slippage, i.e., without waiting for the completion of the slip control. However, when the slip region is narrow, the slip learning control starts at a low frequency, and the effect similar to that in Japanese Patent Laying-Open No. 2004-150548 cannot be expected.

DISCLOSURE OF THE INVENTION

The invention has been made for overcoming the above problems, and it is an object to provide a control device of an automatic transmission that can improve a frequency of learning control in a slip region of a lockup clutch and thereby to improve a control accuracy of slip control without impeding effect of improving fuel consumption.

A control device of an automatic transmission according to the invention controls the automatic transmission formed of a multi-gear or continuously variable transmission mechanism and a torque converter with a lockup clutch arranged between the transmission mechanism and a drive source. When the lockup clutch is used in a slip region, the torque converter is controlled to attain a slippage equal to a target slippage, using a learned value learned in the slip region. This control device includes a region enlarging unit enlarging the slip region to increase a frequency of learning in the slip region, and a learning control unit learning the slippage with respect to an amount of operation in the slip region and obtaining the learned value.

According to the invention, the region enlarging unit enlarges the slip region (i.e., the region in which slip occurs, and thus the region other than a converter region in which the lockup clutch is released and a lockup region in which the lockup clutch is completely engaged) in the torque converter provided with the lockup clutch. Therefore, the slip region is enlarged against a recent tendency to enlarge the lock-up region, and this increases a frequency of the learning control of the slippage with respect to an amount of operation by the learning control unit (i.e., with respect to a duty ratio applied to a solenoid valve arranged in a hydraulic circuit for engaging the lockup clutch). When the frequency of the learning control increases, this increases the control accuracy in slip control (feedforward control) using the learned value obtained by the learning control. Consequently, it is possible to provide the control device of the automatic transmission that can increase the frequency of the learning control in the slip region of the lockup clutch, and can improve the control accuracy of the slip control.

Preferably, the region enlarging unit enlarges a region in which the slippage is extremely small.

According to this invention, the region of an extremely small slippage is enlarged so that the slippage is small, and the power transmission loss is not large. Therefore, even when the lock-up region is enlarged toward the slip region, this does not impede the improvement of fuel consumption. Consequently, it is possible to provide the control device of the automatic transmission that can increase the frequency of the learning control in the slip region of the lockup clutch without impeding the effect of improving the fuel consumption, and thereby can improve the control accuracy of the slip control.

More preferably, the control device further includes a detecting unit detecting an output from the drive source. The region enlarging unit enlarges the slip region according to increase of the output.

According to this invention, the slip region is enlarged with increase in output torque of an engine, i.e., the drive source. Thereby, the learning control is performed in the slip region during a high-load operation so that the learning accuracy can be improved.

BRIEF DESCRIPTION OF THE DRAWINGS

FIG. 3 is an operation table showing correspondence between each gear, and each brake and each clutch.

BEST MODES FOR CARRYING OUT THE INVENTION

Figure 1:
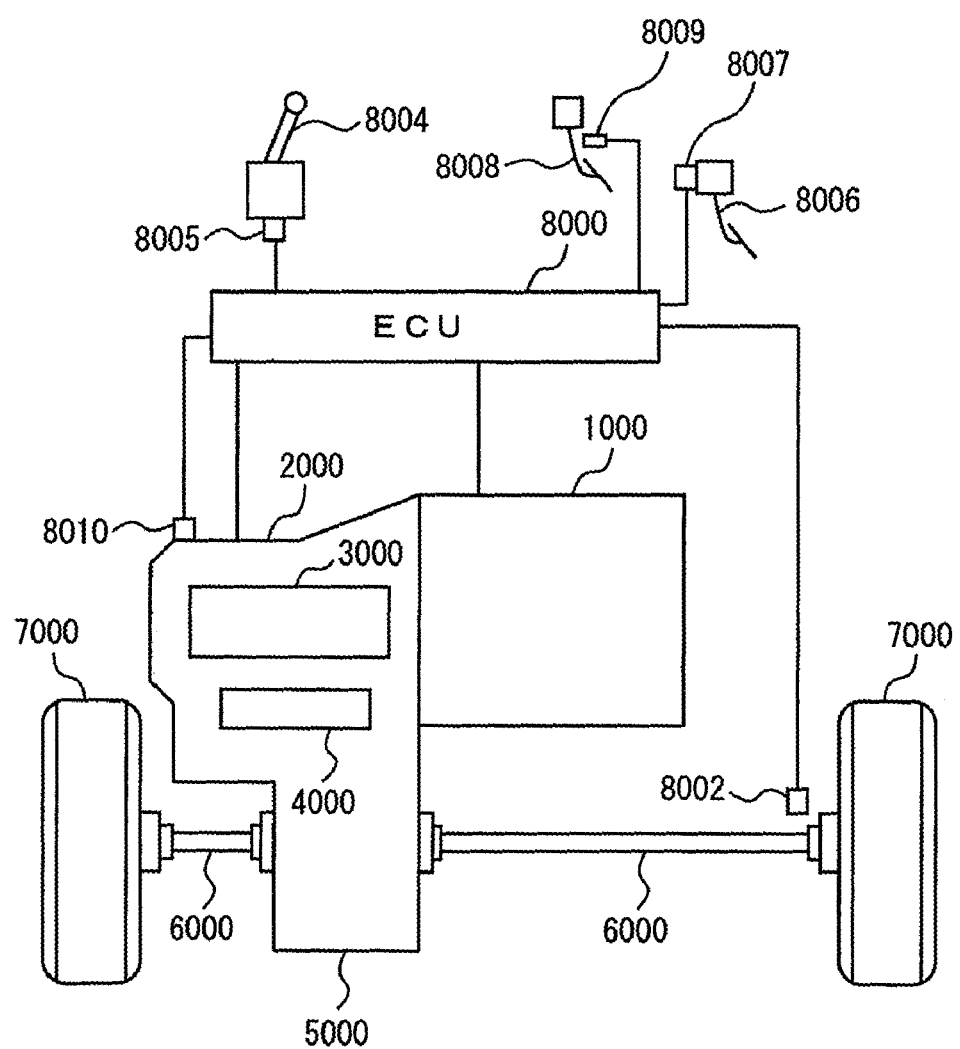
FIG. 1 is a control block diagram showing a vehicle incorporating a control device according to an embodiment of the present invention.

An embodiment of the present invention will be described hereinafter with reference to the drawings. In the description below, the same elements have the same reference characters allotted. Their label and function are also identical. Therefore, detailed description thereof will not be repeated.

A vehicle mounted with a control device of an automatic transmission according to an embodiment of the present invention will be described with reference to FIG. 1. The vehicle is an FF (Front engine Front drive) vehicle. It is noted that a vehicle mounted with the control device of the automatic transmission according to the present embodiment may be a vehicle of a type other than FF. Further, the vehicle may have a belt-type continuously variable transmission mechanism instead of a multi-stage or multi-step transmission mechanism to be described below. The invention can be applied to various automatic transmissions having a torque converter with a lockup clutch.

The vehicle includes an engine 1000, a transmission 2000, a planetary gear unit 3000 constituting a part of transmission 2000, an oil hydraulic circuit 4000 constituting a part of transmission 2000, a differential gear 5000, a drive shaft 6000, front wheels 7000, and an ECU (Electronic Control Unit) 8000.

Engine 1000 is an internal combustion engine that burns a gas mixture of fuel injected from an injector (not shown) and air, in a combustion chamber of a cylinder. A piston in the cylinder is pushed down by the combustion, whereby a crankshaft is rotated. It is noted that an external combustion engine may be employed instead of the internal combustion engine. Meanwhile, a rotating electric machine may be employed instead of engine 1000.

Transmission 2000 converts the revolution speed of the crankshaft to a desired revolution speed for speed change by implementing a desired gear. Transmission 2000 has an output gear that meshes with differential gear 5000. Planetary gear unit 3000 will be described in detail later.

To differential gear 5000, drive shaft 6000 is coupled by spline-fitting for example. Motive power is transmitted to the left and right front wheels 7000 via drive shaft 6000.

To ECU 8000, a vehicle speed sensor 8002, a position switch 8005 for a shift lever 8004, an accelerator position sensor 8007 for an accelerator pedal 8006, a stop lamp switch 8009 provided in a brake pedal 8008, and an oil temperature sensor 8010 are connected via a harness for example.

Vehicle speed sensor 8002 detects the vehicle speed from the revolution speed of drive shaft 6000, and transmits a signal representing the result of detection to ECU 8000. The position of shift lever 8004 is detected by position switch 8005, and a signal representing the result of detection is transmitted to ECU 8000. A gear of transmission 2000 is automatically implemented according to the position of shift lever 8004. Alternatively, the configuration may be such that the driver can select a manual shift mode in which the driver is allowed to select any gear through an operation by himself/herself.

Accelerator position sensor 8007 detects the position of accelerator pedal 8006, and transmits a signal representing the result of detection to ECU 8000. Stop lamp switch 8009 detects an ON/OFF state of brake pedal 8008, and transmits a signal representing the result of detection to ECU 8000. A stroke sensor detecting the extent of stroke of brake pedal 8008 may be provided instead of stop lamp switch 8009. Oil temperature sensor 8010 detects a temperature of an ATF (Automatic Transmission Fluid) of transmission 2000, and transmits a signal representing the result of detection to ECU 8000.

ECU 8000 controls vehicle's devices such that the vehicle attains a desired running state based on signals transmitted from vehicle speed sensor 8002, position switch 8005 and accelerator position sensor 8007, stop lamp switch 8009, oil temperature sensor 8010, and the like, as well as a map and a program stored in a ROM (Read Only Memory).

Figure 2:
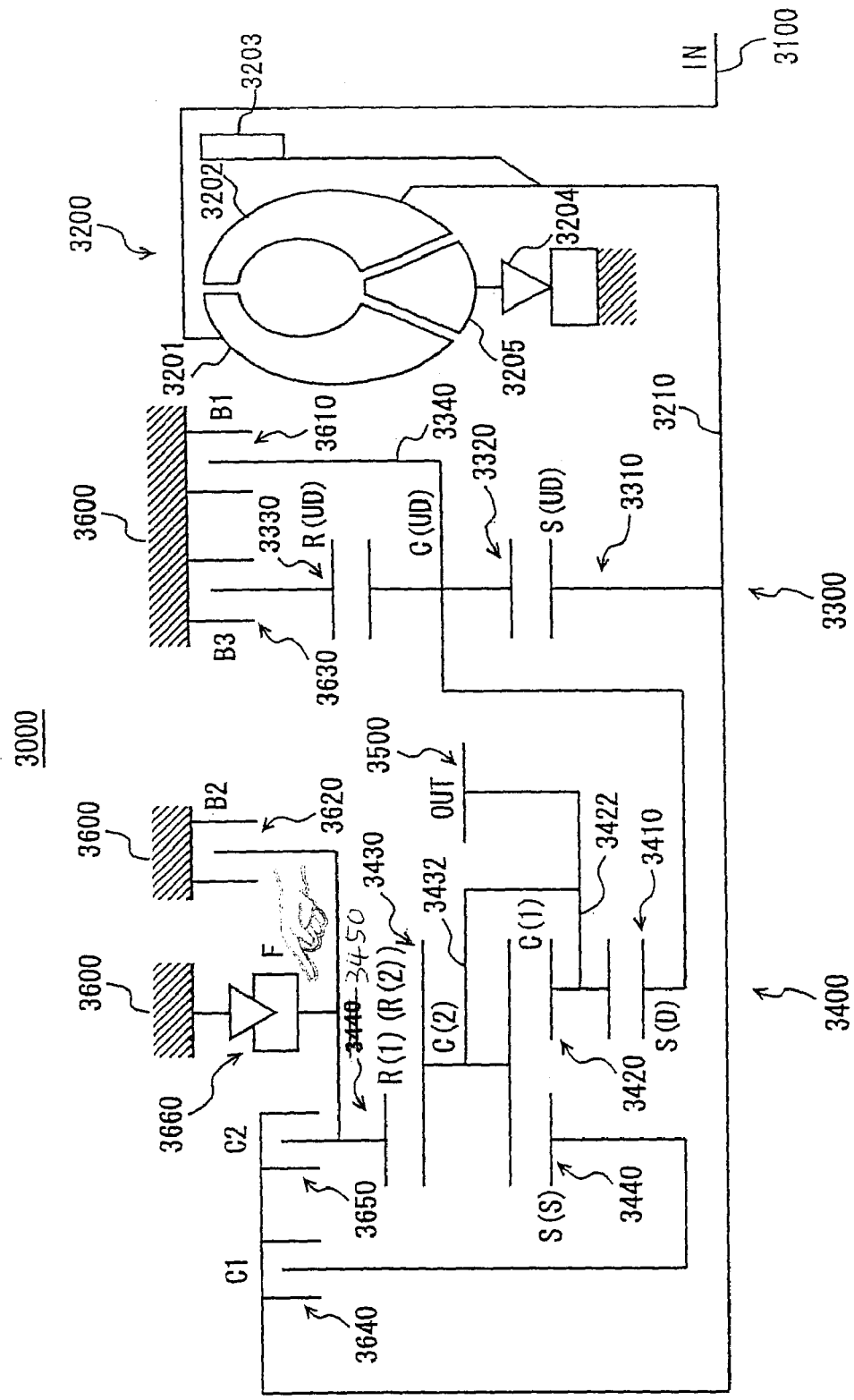
FIG. 2 is a skeleton diagram showing a planetary gear unit.

Referring to FIG. 2, planetary gear unit 3000 will be described. Planetary gear unit 3000 is connected to torque converter 3200 having an input shaft 3100 coupled to the crankshaft. Planetary gear unit 3000 includes a first set of the planetary gear mechanism 3300, a second set of the planetary gear mechanism 3400, an output gear 3500, B1, B2 and B3 brakes 3610, 3620 and 3630 fixed to a gear case 3600, C1 and C2 clutches 3640 and 3650, and a one-way clutch F 3660.

First set 3300 is a single pinion type planetary gear mechanism. First set 3300 includes a sun gear S (UD) 3310, a pinion gear 3320, a ring gear R (UD) 3330, and a carrier C (UD) 3340.

Sun gear S (UD) 3310 is coupled to an output shaft 3210 of torque converter 3200. Pinion gear 3320 is rotatably supported on carrier C (UD) 3340. Pinion gear 3320 engages with sun gear S (UD) 3310 and ring gear R (UD) 3330.

Ring gear R (UD) 3330 is fixed to gear case 3600 by B3 brake 3630. Carrier C (UD) 3340 is fixed to gear case 3600 by B1 brake 3610.

Second set 3400 is a Ravigneaux type planetary gear mechanism. Second set 3400 includes a sun gear S (D) 3410, a short pinion gear 3420, a carrier C (1) 3422, a long pinion gear 3430, a carrier C (2) 3432, a sun gear S (S) 3440, and a ring gear R (1) (R (2)) 3450.

Sun gear S (D) 3410 is coupled to carrier C (UD) 3340. Short pinion gear 3420 is rotatably supported on carrier C (1) 3422. Short pinion gear 3420 engages with sun gear S (D) 3410 and long pinion gear 3430. Carrier C (1) 3422 is coupled to output gear 3500.

Long pinion gear 3430 is rotatably supported on carrier C (2) 3432. Long pinion gear 3430 engages with short pinion gear 3420, sun gear S (S) 3440, and ring gear R (1) (R (2)) 3450. Carrier C (2) 3432 is coupled to output gear 3500.

Sun gear S (S) 3440 is coupled to output shaft 3210 of torque converter 3200 by C1 clutch 3640. Ring gear R (1) (R (2)) 3450 is fixed to gear case 3600 by B2 brake 3620, and coupled to output shaft 3210 of torque converter 3200 by C2 clutch 3650. Ring gear R (1) (R (2)) 3450 is coupled to one-way clutch F 3660, and is disabled in rotation during the drive at the first gear.

FIG. 3 is an operation table showing the relation between gears to be shifted and operation states of the clutches and brakes. The circular mark represents engagement. The X mark represents disengagement. The double circular mark represents engagement only during engine braking. The triangular mark represents engagement only during driving. By operating each brake and each clutch based on the combination shown in the operation table, the forward gears including first to sixth and the reverse gear are implemented.

As one-way clutch F 3660 is provided in parallel to B2 brake 3620, in implementing the first gear (1ST), it is not necessary to engage B2 brake 3620 in the state driven from the engine side (in acceleration), as shown with the double circular mark in the operation table. In the present embodiment, one-way clutch F 3660 prevents rotation of ring gear R (1) (R (2)) 3450, during the drive at the first gear. When engine brake is applied, one-way clutch F 3660 does not prevent rotation of ring gear R (1) (R (2)) 3450.

Torque converter 3200 is formed of a lockup clutch 3203 for directly coupling the input and output shafts together, a pump impeller 3201 on the input shaft side, a turbine runner 3202 on the output shaft side and a stator 3205 that includes a one-way clutch 3204 and has a torque amplifying capability. Torque converter 3200 is connected to the automatic transmission by a rotation shaft. A turbine rotation speed sensor detects an output shaft rotation speed NT (turbine rotation speed NT) of torque converter 3200. An output shaft rotation speed sensor detects an output shaft rotation speed NOUT of the automatic transmission.

ECU 8000 that is the control device according to the embodiment has a feature that a slip region of lockup clutch 3203 is enlarged to increase a frequency of learning in slip control of lockup clutch 3203 and thereby to increase an accuracy of the slip control. The learning control itself of the slip control may be implemented by a known technology, and therefore description thereof is not repeated.

Figure 4:
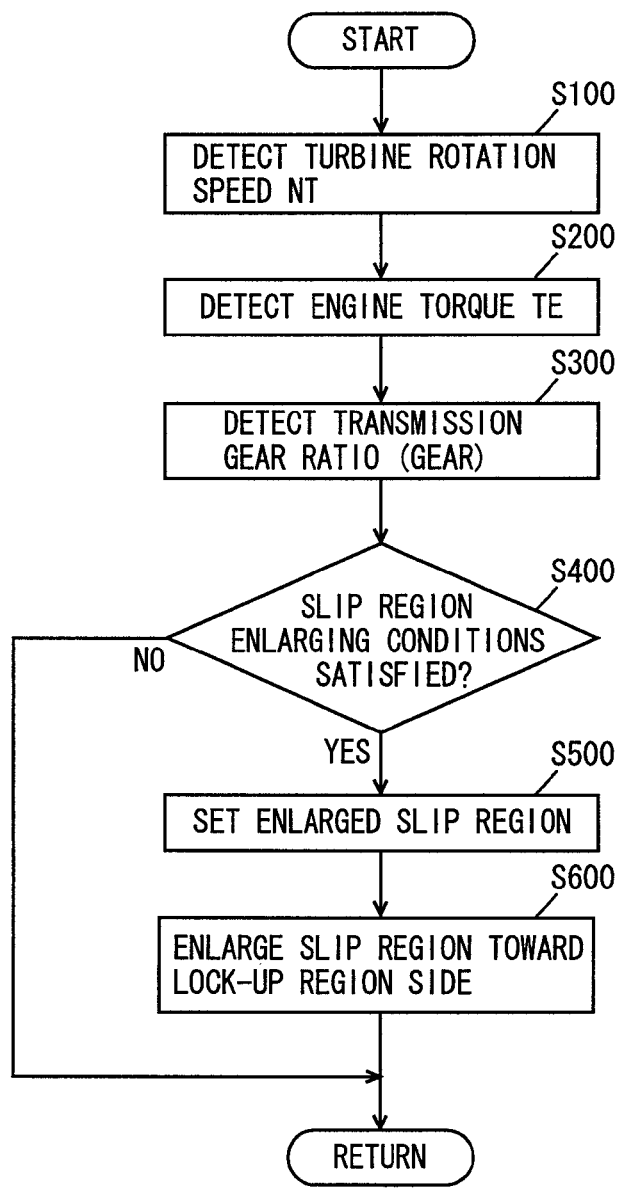
FIG. 4 is flowchart illustrating a control structure of a program executed by an ECU that is the control device according to the embodiment of the invention.

Referring to FIG. 4, description will be given on a control structure of a program executed by ECU 8000 that is the control device of the embodiment. The program represented by the flowchart discussed below is executed at intervals of a predetermined time.

In step S100, ECU 8000 detects turbine rotation speed NT. Turbine rotation speed NT is detected based on a signal provided to ECU 8000 from the turbine rotation speed sensor.

In step S200, ECU 8000 detects an engine torque TE, which is calculated based on, e.g., a map of engine rotation speed NE and a throttle opening or a map represented by other parameters.

In step S300, ECU 8000 detects a transmission gear ratio (a gear) based on a signal, which is provided to ECU 8000 from position switch 8005 of shift lever 8004.

In step S400, ECU 8000 determines whether the slip region enlarging conditions are satisfied or not. When turbine rotation speed NT, engine torque TE and the transmission gear ratio are in predetermined intended ranges, respectively, it is determined that the slip region enlarging conditions are satisfied. In the invention, the conditions are not restricted to the above. When the slip region enlarging conditions are satisfied (YES in S400), the process proceeds to step S500. Otherwise (NO in S400), the processing ends.

In step S500, ECU 8000 sets the enlarged slip region (a range to be enlarged). In this operation, the enlarged slip region is set, e.g., using turbine rotation speed NT, engine torque TE and the transmission gear ratio as parameters. In the invention, the manner of setting the enlarged slip region is not restricted to the above.

In step S600, ECU 8000 enlarges the slip region toward the lockup clutch region side by a magnitude corresponding to the slip region thus set.

ECU 8000 that is the control device of the automatic transmission according to the embodiment controls the operation of the vehicle according to the structure and the flowchart described above, and the operation of the vehicle thus controlled will now be described with reference to FIG. 5 (the invention) and FIG. 6 (prior art).

While engine 1000 is being driven in the vehicle that is provided with the automatic transmission including torque converter 3200 with lockup clutch 3203, the learning control is performed when lockup clutch 3203 enters the slip region during various situations of the running vehicle. When a correction value of this learning control no longer changes outside a predetermined range, it is determined that the learning control is completed. After the learning control of the slip control is performed in this manner, it is possible to calculate a duty ratio to be applied to solenoid valves arranged in the hydraulic circuit for engaging lockup clutch 3203 according to the individual differences, variations, secular changes and the like of lockup clutch 3203, the solenoid valves and the like. Therefore, the accuracy of the feedforward control in the slip region of lockup clutch 3203 is improved. For performing the above learning control at a higher frequency, the state of the vehicle must satisfy the conditions implementing the slip region in which the slip control is performed.

During driving of the vehicle, turbine rotation speed NT is detected (S100), engine torque TE is detected (S200) and the transmission gear ratio is detected (S300). These states of the vehicle are compared with the predetermined slip region enlarging conditions. When the slip region enlarging conditions are satisfied (YES in S400), the slip region is enlarged to increase the frequency of the slip learning control. For example, in a high-load operation or the like, it is determined that the slip region enlarging conditions are satisfied.

The extent (range) by which the enlarged slip region is expanded is determined using turbine rotation speed NT, engine torque TE, the transmission gear ratio and others as the parameters (S500). By the extent thus set, the slip region is enlarged toward the lock-up region side on which the slippage can be extremely small (S600).

Figure 5:
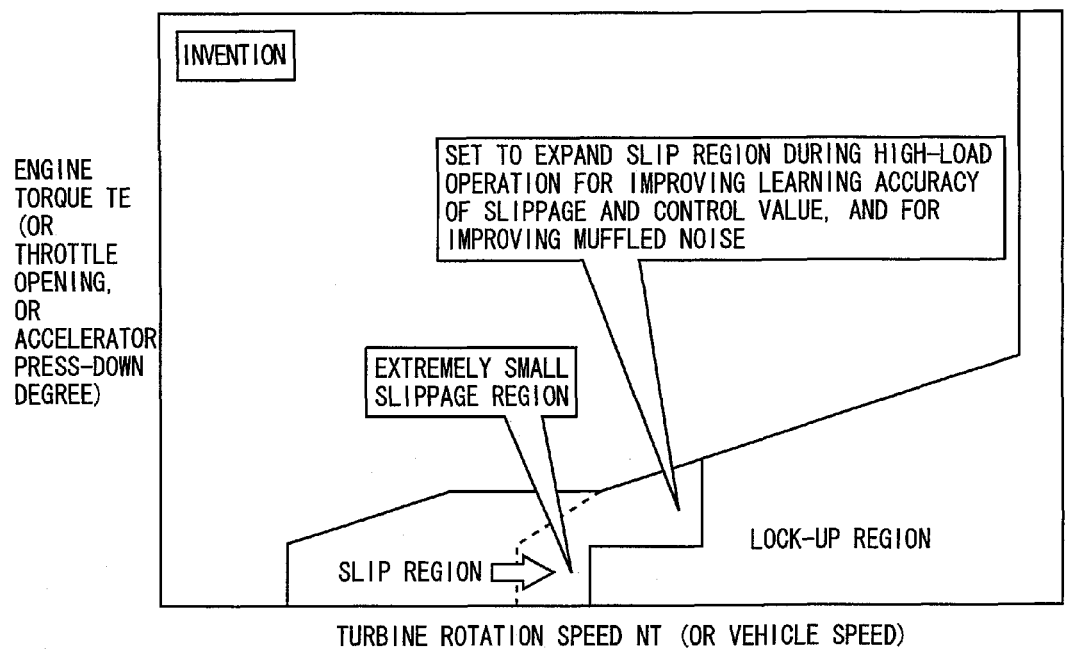
FIG. 5 illustrates states of a lockup clutch executed by the ECU that is the control device according to the embodiment of the invention.
Figure 6:
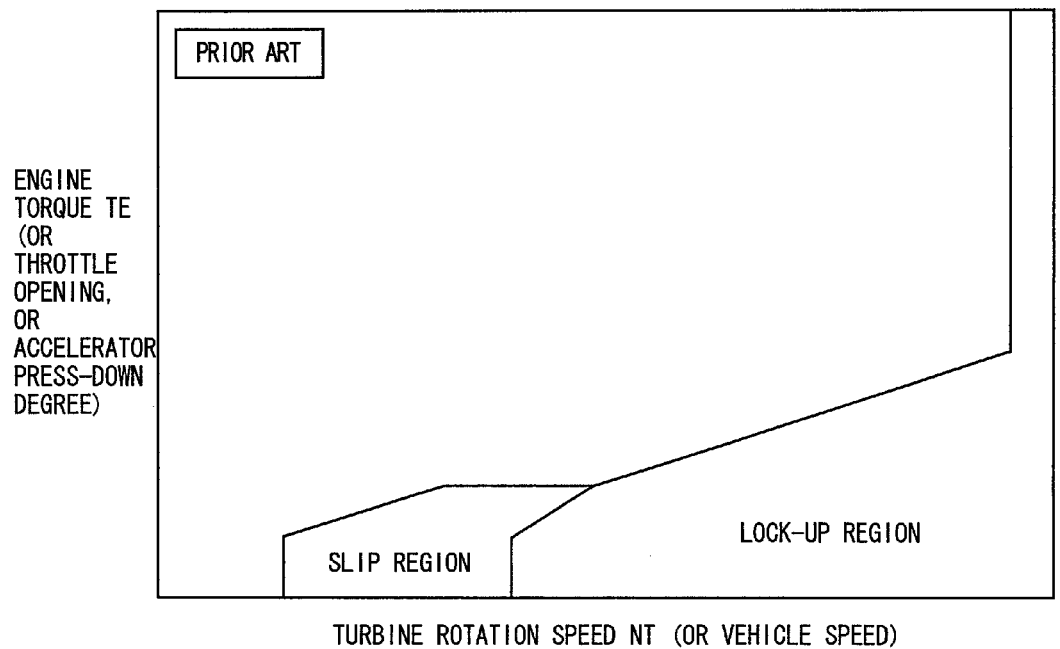
FIG. 6 illustrates states of a lockup clutch executed by an ECU that is a control device of a prior art.

As illustrated in FIG. 5, the slip region is enlarged from a boundary represented by dotted line to a boundary represented by solid line. As illustrated in FIG. 5, turbine rotation speed NT and engine torque TE are used as the parameters for the enlarged range of the slip region. Further, a map illustrated in FIG. 5 may be used for each transmission gear ratio, and a three-dimensional map of turbine rotation speed NT, engine torque TE and the transmission gear ratio may be used.

The slip region is not enlarged toward the converter region side (on which the slippage is large), but is enlarged toward the lock-up side (on which the slippage is small). It can be understood that the slip region in which the learning control of the slip control is performed is enlarged as compared with a conventional slip region in FIG. 6. Since the enlarged slip region is on the lock-up side, the slippage falls within an extremely small range (e.g., of about 10 to 50 rpm). Therefore, during the actual driving of the vehicle, lockup clutch 3203 is controlled in the slip region at a high frequency. Further, the slippage is extremely small. Therefore, even when lockup clutch 3203 is not in the lock-up state but is in the slip state, deterioration of the fuel consumption can be suppressed to the maximum extent.

In this manner, the slip region is enlarged toward the high-load side (lock-up side) to increase the frequency of the slip learning control. The control value in the feedforward control of the slip control (i.e., the duty ratio to be applied to the solenoid valve arranged in the hydraulic circuit) reflects the value attained in the state where the learning is completed in the slip learning control (feedback control). Therefore, when the frequency of the learning control in the feedback control increases, the accuracy of the control value in the feedforward control is improved, and the accuracy of the slip control is improved. Particularly, the learning in the high-load state can improve the accuracy of the learning control.

As described above, the ECU that is the control device of the automatic transmission of the embodiment can enlarge the slip region of the lockup clutch and thereby can increase the frequency at which the slip learning control is executed by the feedback control. Consequently, in spite of the recent tendency to enlarge the lock-up region, the slip region can be enlarged and the accuracy of the slip control can be increased. Since the slip region is enlarged toward the high-load side (lock-up side) on which the slip rotation speed is low, the enlargement does not impede the effect of improving the fuel consumption.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A control device of an automatic transmission formed of a multi-gear or continuously variable transmission mechanism and a lockup clutch arranged between said transmission mechanism and a drive source, wherein when said lockup clutch is used in a slip region, control is performed to attain a slippage equal to the target slippage, using a learned value learned in said slip region, said control device comprising:
a region enlarging unit which enlarges said slip region to increase a frequency of learning in said slip region, and
a learning control unit which learns the slippage with respect to an amount of operation in said slip region and obtaining said learned value, wherein said region enlarging unit enlarges said slip region toward a lockup region in which said lockup clutch is completely engaged.

2. The control device of the automatic transmission according to claim 1, wherein
said control device of the automatic transmission further comprises a detecting unit detecting an output from said drive source, and
said region enlarging unit enlarges said slip region according to increase of said output.

3. A control device of an automatic transmission formed of a multi-gear or continuously variable transmission mechanism and a lockup clutch arranged between said transmission mechanism and a drive source, wherein when said lockup clutch is used in a slip region, control is performed to attain a slippage equal to the target slippage, using a learned value learned in said slip region, said control device comprising:
region enlarging means for enlarging said slip region to increase a frequency of learning in said slip region, and
learning control means for learning the slippage with respect to an amount of operation in said slip region and obtaining said learned value,
wherein said region enlarging means includes means for enlarging said slip region toward a lockup region in which said lockup clutch is completely engaged.

4. The control device of the automatic transmission according to claim 3, wherein
said control device of the automatic transmission further comprises detecting means for detecting an output from said drive source, and
said region enlarging means includes means for enlarging said slip region according to increase of said output.

5. A control device of an automatic transmission formed of a multi-gear or continuously variable transmission mechanism and a lockup clutch arranged between said transmission mechanism and a drive source, wherein when said lockup clutch is used in a slip region, control is performed to attain a slippage equal to the target slippage, using a learned value learned in said slip region, said control device comprising:
an electronic control unit (ECU),
wherein said electronic control unit (ECU) enlarges said slip region toward a lockup region in which said lockup clutch is completely engaged to increase a frequency of learning in said slip region, and obtains said learned value by learning the slippage with respect to an amount of operation in said slip region.

* * * * *